Patented Aug. 12, 1941

2,252,521

UNITED STATES PATENT OFFICE 2,252,521

CELLULOSE ETHER VARNISH AND METHOD OF MAKING IT

Norman R. Peterson and Joseph L. Sherk, Midland, Mich., assignors to The Dow Chemical Company, Midland, Mich., a corporation of Michigan No Drawing. Application August 30, 1939, Serial No. 292,686

15 Claims. (Cl. 106—172)

This invention relates to oleo-resinous varnishes comprising cellulose ethers and is particularly concerned with the method whereby such varnishes may be prepared.

Bucy has described in U. S. Patent No. 2,148,601 a procedure for incorporating cellulose ethers in oleo resinous varnishes. His method is applicable primarily to the preparation of varnishes of short oil length. Hereinafter the term "oil length" of a varnish will be employed in the conventional manner as a definition of the number of gallons of oil present in the varnish for each 100 pounds of resin therein. The procedure described in the aforesaid U. S. Letters Patent consists essentially of two steps:—first, reacting an oil resin mixture at elevated temperature; and second, dissolving an organo-soluble cellulose ether in the so-reacted mixture with the aid of heat. As the method is described, the drying oil-resin mixture is held at a high temperature of, for example, 500° F. or more for sufficient time to allow of reaction between the oil and the resin. While the oil and resin are being heated to effect the reaction, there occurs an appreciable amount of bodying or thickening of the oil, which is especially pronounced in the case of easily polymerizable drying oils, such as tung oil, oiticica oil, and dehydrated castor oil. The extent of the bodying by heat must be controlled, since this reaction, if allowed to proceed too far, makes difficult or prevents subsequent solution of a cellulose ether in the bodied oil-resin mixture, especially when these mixtures comprise a large proportion of oil. Thus it is taught that to avoid incompatibility of the cellulose ether the oil-resin mixture must not be heated too long, and it must contain more than about 40 per cent of its weight of drying oil. The proportions recited in the aforesaid patent will form varnishes of oil length less than about 20, and with most oils and resins the varnishes will have an oil length less than about 12. Such varnishes have limited fields of application. For many uses it is desirable to have varnishes of long oil lengths, i. e. lengths up to 75 gallons or more of oil per 100 pounds of resin. In medium and long oil varnishes, the ratio of resin to oil is too low to permit the resin to serve in the capacity of a blending agent for the oil and cellulose ether, as it does in short oil varnishes.

Generally speaking, a short oil varnish contains from 6 to 15 gallons of oil per 100 pounds of resin and is useful as a rubbing varnish, for example, for use in furniture coating. Varnishes of 15 to 30 gallon lengths are of primary value as floor varnishes and may be designated as medium length varnishes. Varnish compositions of oil length from 30 to 75 gallons or more may be designated as long oil varnishes and are useful primarily as water-proofing coatings, outdoor varnishes, and the like. Such compositions include the customary water-proofing spar varnishes which do not, however, contain cellulose ether. A cellulose ether varnish of any oil length may be used in making enamels, and the long oil varnishes can make good printing inks.

It is accordingly among the objects of the invention to provide a method whereby varnishes comprising organo-soluble cellulose ethers and of any desired oil length may be obtained. Another object is to provide a method whereby long oil varnishes may be obtained comprising cellulose ethers. A further object is to provide a method whereby homogeneous blends of drying oil, varnish resin, and organo-soluble cellulose ether may be obtained after only a short period of cooking, which compositions form clearly stable solutions with hydrocarbon thinners. Yet another object is to provide a method whereby oleo resinous varnishes containing cellulose ethers may be prepared which are miscible with varnish thinners to form clear solutions of high solids content and low viscosity.

According to the invention, the above and related objects are attained by cooking oleo resinous varnishes comprising organo-soluble cellulose ethers in the presence of a minor proportion of a lead or zinc compound which will dissolve in the varnish cook during the heating period. The invention will be illustrated in the present application by reference to lead compound catalysts. The lead compounds which are suitable for this use include lead oxide, lead salts of the resin acids, such as lead rosinate, lead salts of fatty acids, such as lead acetate or lead stearate, the lead salts of naphthenic acids, and lead carbonate. The amount of lead compound employed for the purpose may vary from 0.2 to 1.5 per cent and preferably from 0.5 to 1 per cent, calculated as metallic lead and based on the weight of the oil.

In general, the varnish cook is made by first heating together the resin and oil constituents and the cellulose ether is later added to the hot mixture. The lead or zinc compound may be added to the oil-resin mixture prior to heating or on the "up heat" or it may be added at the same time as the cellulose ether. The compound of lead appears to catalyze the reaction between the oil and the resin as well as the reaction between these materials and the cellulose ether, and produces a varnish blend which is miscible with the customary hydrocarbon thinners, and especially those thinners which contain a minor proportion of aromatics. In the case of short oil varnishes, the lead compound accelerates the reaction, making possible the preparation of a varnish in a shorter time than when no lead compound is present. When preparing medium or long oil varnishes comprising cellulose ethers, the lead compound makes possible the use of a much larger proportion of oil, and, hence, leads to the preparation of a type of varnish not heretofore attainable containing a cellulose ether.

As is usual in the varnish making art, there cannot be set down a generalized cooking schedule applicable to all varnishes of a class with any precision. The conditions used in the cook are varied accoring to the nature and amount of resin used, the type of oil and other ingredients each modifying the cooking schedule. Since the variants are in general understood by skilled varnish makers, an attempt will be made here to outline a range of working conditions applicable to the preparation of the cellulose ether varnishes, according to the invention. The oil and varnish resin are mixed and heated to a solution temperature between 400° and 600° F., depending on the resin. Heating is generally effected at a rate of 10 Fahrenheit degrees per minute, although faster or slower heating may be used. After the resin has dissolved in, or reacted with the oil to form a homogeneous mixture, the heating is continued at a gas-proofing temperature between 450° and 580° F., especially when tung oil is used, for a minimum gas-proofing effect. When cellulose ether varnishes are to be made, gas-proofing is continued only about half as long as with similar compositions which are to contain no cellulose ether. After the brief gas-proofing, the cook is chilled back, if necessary, to about 470° to 525° F., suitably by addition of more oil which has been reserved for the purpose. The cellulose ether is added portionwise and with stirring while the cook is in or near this temperature range and then held at a temperature above 400° F. and preferably at 420° to 500° F. for a few minutes (usually 5 to 20 minutes) to control the viscosity of the cook and to improve its ultimate solubility in hydrocarbon thinners. The longer the "hold," the lower is the viscosity and the greater the tolerance to thinners. When the cellulose ether has become dissolved and the cooking continued long enough to give the desired viscosity and tolerance properties and at least until a drop withdrawn and cooled on a test plate is perfectly clear, haze-free, and miscible with thinner, the thinner is added at as high a temperature as practical which may be 450° F. or lower. The thinned varnish is cooled and a drier added. The lead compound employed as catalyst is added at any stage prior to or concurrently with the addition of the cellulose ether, and in short oil varnishes is added any time before cooking is discontinued, serving to lower the viscosity of the cook and to shorten the cooking time. At no point in the cook is any mutual solvent for oil, resin and cellulose ether employed other than these ingredients themselves and the lead compound catalyst.

The use of zinc catalysts for the present purposes in amount representing from 0.01 to 0.3 per cent of zinc, based on the weight of the oil is described and claimed in our concurrently filed U. S. patent application Serial No. 292,687.

The lead compound employed as catalyst delays the bodying of the oil during the cooking operation, even when large proportions of oil to resin are employed. The time required to make an oil-resin mixture compatible with a cellulose ether (i. e. the time between additions of cellulose ether and thinner) is reduced by at least 50 per cent when using the herein described catalyst as contrasted with the time required at the corresponding stage to produce a like composition when making short oil varnishes without the lead catalyst. The most important advantage of the present invention is believed to be the adaptability of the herein described method to the preparation of medium and long oil varnishes comprising cellulose ethers and such easily polymerized oils as tung, oiticica and dehydrated castor oil. While the use of the lead compound permits of the preparation of varnish compositions in relatively short time, it has been found that longer cooking times do not impair the compatibility of the ethyl cellulose and the oil-resin cook. The present method makes possible the preparation of a wide variety of types of varnishes under rather broad conditions of operation.

Varnish compositions which may be prepared according to the method of the invention may contain from 1 to 25 per cent of a cellulose ether, from 15 to 80 per cent of a drying or semi-drying oil, and from 15 to 80 per cent of a resin. It may also contain such common addition agents as pigments, metallic soaps, driers, and the like.

Among the organo-soluble cellulose ethers that may be used in the herein described method to provide the new compositions are ethyl cellulose, propyl cellulose, butyl cellulose, benzyl cellulose, or mixed ethers, such as ethyl propyl cellulose, ethyl butyl cellulose, and the like. As to the physical nature of the cellulose ether employed, it should be of the organo-soluble type and may be of any viscosity grade, although for the preparation of low viscosity compositions of high solids content it is preferred to use a low viscosity type of cellulose ether. Regardless of the viscosity characteristics of the cellulose ether employed, it is not desirable in most cases to use more than 25 per cent of the cellulose ether, based on the total weight of non-volatile solids in the varnish composition, since the viscosity of the varnish increases rapidly as the amount of cellulose ether is increased.

Any of the oil-soluble varnish resins may be used as the resin ingredient in the composition, and for our present purposes the term "oil-soluble varnish resins" is intended to designate resins which are either initially soluble in varnish oils or which become soluble therein during the cooking operation, possibly only after the addition of the lead compound employed as a catalyst. A list of a few of the types of suitable resins and at least one example of specific resins falling under each type is given in the following table. The said list is merely illustrative of the wide variety of types of resins which may be used, and accordingly should not be construed as limiting the invention.

| Resin type | Commercial name |
| --- | --- |
| Pure phenolic | BR 254<br>BR 1329<br>BR 3360<br>BR 4036<br>Beckacite 1001<br>Durez 202 |
| Oil modified phenolic | XR 3342<br>BR 302<br>Durez 210 |
| Coumarone indene | Cumar W2½ |
| Run copal | Kopol 502 |
| Ester gum | Ester gum |
| Phenol modified natural resin | Phenac 615<br>Beckopol 1400 |
| Resin acid modified alkyd | Rezyl 408 |

There may be used any drying, semi-drying oil or non-drying oil of the glyceride type, as the oil ingredient of the compositions preparable according to the present method. Examples of such oils in common use, each of which may be employed, include tung oil, linseed oil, dehydrated castor oil, oiticica oil, fish oil, soya bean oil, perilla oil, corn oil, cotton seed oil, sesame oil, and the like.

The compositions made by the cooking process of the present invention may be thinned with hydrocarbon solvents or customary varnish thinners and particularly with those which contain only a minor proportion of aromatic hydrocarbons. Suitable thinners may be prepared by adding a minor quantity of an aromatic hydrocarbon, such as xylene or toluene, to a thinner of a wholly aliphatic character, such as the customary mineral spirits. Alternatively the hydrogenated naphthas and the aromatic naphthas or "high solvency naphthas" may be used since these consist of mixtures of aliphatic hydrocarbons and aromatics. The high solvency naphthas may be diluted with purely aliphatic thinners to obtain suitable thinners for use with the present compositions; for example, the hydrogenated naphthas and their chemical equivalents, known commercially under the names Solvesso, Solvsol, Union aromatic solvent, Shell solvent T. S., and the like, when mixed with equal volumes of mineral spirits, are thinners miscible with the varnish compositions of the present invention. It is to be understood that the cellulose ether is completely dissolved in the oil-resin mixture prior to the addition of any thinner or other volatile varnish component. Hence, the use of aromatic hydrocarbons or other thinners which are capable of dissolving cellulose ethers is not the equivalent of the "cold cut" method of preparing cellulose ether varnishes disclosed in the prior art. If desired, solvents of the ester, ketone, or alcohol type may be added to the thinner employed; but in general their use is not to be recommended where several coats of varnish are to be applied, one over the other, since these active solvents tend to lift previously applied coats. The amount of thinner added to the cooked composition is preferably such that the final coating composition contains between about 20 and 90, and preferably between 40 and 60 per cent of solids by weight. The expression "solids" is here used in its customary varnish meaning to designate the oil, resin and cellulose ether, none of which are volatile under the customary conditions of application and use. Compositions containing from 40 to 60 per cent of solids and correspondingly from 60 to 40 per cent of thinner have sufficiently low viscosity for all of the usual uses to which varnishes are put. The viscosity of the thinned composition having a solids content in the said range is ordinarily from about 0.5 to 2.5 poises. This is a remarkably low viscosity range for a coating composition having as high solids content as that just indicated.

The invention may be better understood by reference to the following examples which are given merely by way of illustration and are not to be construed as limiting:

*Example 1*

Preparation of an 8 gallon varnish suitable for use as a rubbing varnish. The ingredients used were:

|  | Parts by weight | Per cent |
|---|---|---|
| Amberol K12A* | 1000 | 50 |
| Tung oil | 500 | 25 |
| Ethyl cellulose, 10 centipoise type, standard ethoxy | 400 | 20 |
| Heat bodied linseed oil, 4.35 poises | 100 | 5 |
| Fused lead resinate (21% Pb) | 18 |  |

*Amberol K12A is said to be a modified phenolic resin of high acid number, soluble in aromatic and aliphatic hydrocarbons and in oils, and to be useful in oleoresinous varnishes. See Gardner, "Physical and Chemical Examination of Paints, Varnishes, Lacquers and Colors," Institute of Paint and Varnish Research, Washington, D. C., ed. 8 (1937), page 1449.

The resin, linseed oil and 300 grams of tung oil were heated to 520° F. in the course of 30 minutes. The balance of the tung oil was added, chilling the cook back to 480° F. at which temperature the ethyl cellulose was stirred in, the temperature falling to 410° F. Heating was renewed, the lead resinate was added, and the temperature of the cook was brought to 470° F. in about 7 more minutes, at which time all of the ethyl cellulose was in solution. Heating was continued and the temperature rose to 480° F., at which point the fire was extinguished and the cook allowed to cool to 400° F. and thinned with its own weight of a mixture of equal volumes of mineral spirits and high solvency naphtha. Naphthenate driers were then added containing 0.02 per cent of cobalt and 0.02 per cent of manganese, based on the weight of the oils, and the varnish was ready for use.

A similar cook was made employing the same ingredients in the stated proportions and thinned with a mixture consisting of 75 per cent xylene, 20 per cent butanol, and 5 per cent of denatured anhydrous ethyl alcohol to form a solution of 45 per cent concentration. This solution had a viscosity of 1 poise.

By way of contrast, a "cold cut" varnish containing the same ingredients in the stated proportions was prepared by dissolving the various components in the xylene-butanol-alcohol solvent at room temperature to form a 45 per cent solution. No preliminary cooking was employed. The resulting composition had a viscosity of 12.9 poises and had to be thinned to about 30 per cent solids before having as low a viscosity as the cooked varnish lacquer composition mentioned above.

*Example 2*

Preparation of 14 gallon length varnish. The ingredients employed were:

|  | Parts by weight | Per cent |
|---|---|---|
| Bakelite resin 2963* | 768 | 38.4 |
| Tung oil | 732 | 36.6 |
| Heat bodied linseed oil | 100 | 5.0 |
| Ethyl cellulose | 400 | 20.0 |
| Lead acetate | 8.3 |  |

*Bakelite resin 2963 is described by Gardner, "Physical and Chemical Examination of Paints, etc.," ed. 8 (1937), page 1453, as a resin modified phenolic, and by the Bakelite Corp., in Bakelite circular form X-126, published November 21, 1934, as a rosin modified phenol formaldehyde resin.

The resin and 500 grams of the tung oil were heated to 550° F. in about 28 minutes when the balance of the tung oil and the linseed oil were added, cooling the cook to 465° F. The ethyl cellulose was stirred in at this temperature. While the varnish kettle was being heated slowly, the lead acetate was added. The temperature of the batch was raised to 480° F. and held for 10 minutes. The cook was now cooled to 440° F. and thinned, part of it being diluted with a mixture of high solvency naphthas and mineral spirits, the other part with a mixture of an aromatic petroleum naphtha and butanol. Both compositions were extremely clear and had a low ratio of viscosity to solids content. They were useful for the various purposes to which short oil varnishes are ordinarily applied.

Example 3

Preparation of 30 gallon varnish. The ingredients:

| | |
|---|---|
| Phenac 633M* | per cent.. 27 |
| Tung oil | do 54 |
| Heat bodied linseed oil | do 11 |
| Ethyl cellulose, low viscosity, standard ethoxy | do 8 |
| Lead resinate (10% Pb), per cent of total weight of the other ingredients | 2.5 |

*Phenac 633M is described by Gardner, "Physical and Chemical Examination of Paints, etc." ed. 8 (1937), page 1482, as a modified phenolic resin, melting point 130°–135° C., soluble in aromatic hydrocarbons, useful in 4-hour varnishes.

The resin, tung oil and lead resinate were heated to 590° F., at which temperature the linseed oil was added, chilling the cook back to 540° F. The batch was allowed to cool to 490° F. at which temperature the ethyl cellulose was added with stirring which lowered the temperature to about 450° F. The latter temperature was held for 15 minutes after which the cook was thinned to 50 per cent solids concentration with an equal volume mixture of mineral spirits and Union Aromatic Solvent. Cobalt naphthenate containing an amount of cobalt equivalent to 0.05 per cent of the weight of oils was added as a drier. The varnish was clear, bright, and stable and was adapted for general uses, such as application to woodwork, floors and the like.

By way of contrast a varnish containing the same ingredients except that the lead resinate was omitted was prepared in a like manner except that the varnish and oil were heated at top heat for 27 minutes before cooling and adding the ethyl cellulose, and after the latter ingredient was added the composition was held at 450° F. for 20 minutes and thinned as before. The ethyl cellulose precipitated on standing and the varnish was entirely unsatisfactory.

Example 4

Ingredients:

| | Parts by weight | Percent |
|---|---|---|
| Tung oil | 1335 | 53.4 |
| Bakelite resin 254 | 618 | 24.7 |
| Cumar resin W2½ | 47 | 1.9 |
| Ethyl cellulose | 500 | 20.0 |
| Lead acetate | 13.5 | |

A 26 gallon varnish was made by heating the oil and resin components to 300° F., adding the ethyl cellulose and increasing the temperature to 450° F. where it was held for 15 minutes. The lead acetate was added at this temperature 3 minutes before the fire was pulled. The varnish was thinned to 40 per cent solids with a hydrogenated naphtha known as Solvesso No. 3, forming a clear satisfactory solution.

When a similar cooking procedure was employed on the same ingredients but without the lead acetate, the solids settle out from the thinner on standing and the composition could not be used.

Example 5

Preparation of varnish of intermediate (about 25 gallons) oil length. The following varnish ingredients were employed in the preparation of an intermediate oil length varnish:

| | Parts by weight | Percent |
|---|---|---|
| Durez 210 resin | 666.6 | 30.3 |
| Heat bodied linseed oil | 266.6 | 12.1 |
| Raw tung oil | 1066.6 | 48.5 |
| Ethyl cellulose, 9 centipoise, 48.5% ethoxy | 173.2 | 7.9 |
| Lead acetate | 26.6 | 1.2 |

The resin and tung oil were heated at a uniform rate in a varnish kettle to attain a temperature of 565° F. in about 30 minutes. The fire was extinguished and half of the linseed oil was added, followed by the lead acetate and the balance of the linseed oil. The composition was cooled to about 500° F., at which temperature the ethyl cellulose was added with stirring. In 4.5 minutes the temperature had dropped to 460° F. where it was held for 5 minutes and then allowed to drop further. The cook was thinned with an equal volume mixture of its own weight of hydrogenated petroleum naphtha and mineral spirits. The product was clear and homogeneous and was useful wherever intermediate length varnishes are employed.

A varnish was made for purposes of comparison containing the same ingredients with the exception of lead acetate, and the cooking schedule employed was identical with that described. The product was cloudy even while hot and the ethyl cellulose precipitated out on cooling prior to the addition of the thinner. Precipitation of the ethyl cellulose was completed by the addition of thinner inasmuch as the thinner employed is a non-solvent for ethyl cellulose.

The present application has disclosed both zinc and lead compounds as catalysts in the preparation of cellulose ether varnishes and has illustrated the invention with reference to the lead compounds, while the use of zinc compounds is described in a concurrently filed application, Serial No. 292,687. The new compositions are claimed herein.

We claim:
1. The method which comprises cooking together a mixture consisting essentially of from 15 to 80 per cent of an oil of the glyceride type and an oil-soluble resin at a solution temperature between 400° and 600° F., adding to the mixture from 1 to 25 per cent of an organo-soluble cellulose ether, and a compound selected from the class consisting of lead compounds and zinc compounds soluble in the varnish cook; the said class of lead and zinc compounds being capable of accelerating and being employed in amount sufficient to accelerate the reactions among the oil, resin, and cellulose ether components, and to make the cellulose ether compatible with the other components in the absence of a mutual solvent; and continuing the cooking at a temperature above 400° F. at which the cellulose ether dissolves in the mixture until the cellulose ether is dissolved, thereby to produce a cooked oleo-resinous cellulose ether varnish which is miscible to form clear solutions with predominantly aliphatic hydrocarbon thinners containing only minor amounts of aromatics, irrespective of the oil length of the said cooked varnish,

2. The method which comprises cooking together a mixture consisting essentially of from 15 to 80 per cent of an oil of the glyceride type and an oil-soluble resin at a solution temperature between 400° and 600° F., adding to the mixture from 1 to 25 per cent of an organo-soluble cellulose ether, and a lead compound soluble in the varnish cook; the lead compound being capable of accelerating and being employed in amount sufficient to accelerate the reactions among the oil, resin, and cellulose ether components, and to make the cellulose ether compatible with the other components in the absence of a mutual solvent; and continuing the cooking at a temperature above 400° F. at which the cellulose ether dissolves in the mixture until the cellulose ether is dissolved, thereby to produce a cooked oleo-resinous cellulose ether varnish which is miscible to form clear solutions with predominantly aliphatic hydrocarbon thinners containing only minor amounts of aromatics, irrespective of the oil length of the said cooked varnish.

3. The method as claimed in claim 2, wherein the lead compound is employed in amount sufficient to contain from 0.2 to 1.5 per cent of lead based on the weight of the oil.

4. The method as claimed in claim 2, wherein the lead compound is employed in amount sufficient to contain from 0.5 to 1 per cent of lead based on the weight of the oil.

5. The method which comprises cooking together a mixture consisting essentially of from 15 to 80 per cent of an oil of the glyceride type and an oil-soluble resin at a solution temperature between 400° and 600° F. until the mixture is homogeneous, continuing cooking at a gas-proofing temperature for about one-half the normal gas-proofing period, adding to the mixture from 1 to 25 per cent of an organo-soluble cellulose ether at a temperature about 400° F., maintaining the temperature above 400° F. until a sample withdrawn and cooled is clear, haze-free and miscible with predominantly aliphatic hydrocarbon thinners containing only minor amounts of aromatics, the cooking operation, of least after addition of the cellulose ether, being effected in the presence of a lead compound soluble in the varnish cook, capable of accelerating and in amount sufficient to accelerate the reaction among the oil, resin, and cellulose ether components, and to make the cellulose ether compatible with the other components in the absence of mutual solvents.

6. The method as claimed in claim 2, wherein the lead compound is lead resinate.

7. The method as claimed in claim 2, wherein the cellulose ether is ethyl cellulose.

8. The method as claimed in claim 5 wherein the cellulose ether is ethyl cellulose.

9. The method as claimed in claim 2, wherein the proportion of oil to resin is greater than 20 gallons of the former for each 100 pounds of the latter, thereby to prepare a medium or long oil varnish containing a cellulose ether, the said varnish being miscible with predominantly aliphatic hydrocarbon thinners containing only minor amounts of aromatics to form clear solutions of low viscosity relative to solids content.

10. The method as claimed in claim 5, wherein the proportion of oil to resin is greater than 20 gallons of the former for each 100 pounds of the latter, thereby to prepare a medium or long oil varnish containing a cellulose ether, the said varnish being miscible with predominantly aliphatic hydrocarbon thinners containing only minor amounts of aromatics to form clear solutions of low viscosity relative to solids content.

11. The method as claimed in claim 5, wherein at least part of the oil employed is a readily polymerized oil selected from the class consisting of tung oil, oiticica oil and dehydrated castor oil.

12. A cooked oleo resinous varnish of oil length greater than 20 gallons comprising from 1 to 25 per cent of an organo-soluble cellulose ether, and miscible with predominantly aliphatic hydrocarbon thinners containing only a minor proportion of aromatics to form clear, stable varnish compositions.

13. A cooked oleo-resinous varnish of oil length greater than 20 gallons comprising from 1 to 25 per cent of organo-soluble ethyl cellulose, and miscible with predominantly aliphatic hydrocarbon thinners containing only a minor proportion of aromatics to form clear, stable varnish compositions.

14. A cooked oleo-resinous varnish of oil length greater than 20 gallons comprising from 1 to 25 per cent of an organo-soluble cellulose ether, free from active mutual solvents for the oil, resin and cellulose ether components, and miscible with predominantly aliphatic hydrocarbon thinners containing only a minor proportion of aromatics to form clear, stable varnish compositions.

15. A cooked oleo-resinous varnish of oil length greater than 20 gallons comprising from 1 to 25 per cent of an organo-soluble cellulose ether and wherein at least part of the oil is a readily polymerized oil selected from the class consisting of tung oil, oiticica oil and dehydrated castor oil, the varnish being miscible with predominantly aliphatic hydrocarbon thinners containing only a minor proportion of aromatics to form clear, stable varnish compositions.

NORMAN R. PETERSON.
JOSEPH L. SHERK.